(12) United States Patent
Hsieh et al.

(10) Patent No.: US 8,646,359 B2
(45) Date of Patent: Feb. 11, 2014

(54) BICYCLE PEDAL ASSEMBLY

(76) Inventors: Chin-Long Hsieh, Taichung (TW);
Tsung-Tse Huang, Taichung (TW)

( * ) Notice: Subject to any disclaimer, the term of this patent is extended or adjusted under 35 U.S.C. 154(b) by 0 days.

(21) Appl. No.: 13/592,348

(22) Filed: Aug. 23, 2012

(65) Prior Publication Data

US 2013/0312569 A1 Nov. 28, 2013

(30) Foreign Application Priority Data

Jun. 1, 2012 (TW) .............................. 101210086 U

(51) Int. Cl.
*B62M 3/00* (2006.01)

(52) U.S. Cl.
USPC ........................................................ 74/594.6

(58) Field of Classification Search
USPC .............. 74/560, 594.1, 594.4, 594.6; 36/131
See application file for complete search history.

(56) References Cited

U.S. PATENT DOCUMENTS

| | | | | |
|---|---|---|---|---|
| 4,827,797 A | * | 5/1989 | Le Faou et al. | 74/594.6 |
| 4,893,420 A | * | 1/1990 | Bezin et al. | 36/131 |
| 5,199,192 A | * | 4/1993 | Kilgore et al. | 36/131 |
| 5,381,708 A | * | 1/1995 | Liao | 74/594.6 |
| 7,024,962 B2 | * | 4/2006 | Chen | 74/594.6 |
| 2007/0094898 A1 | * | 5/2007 | Xie | 36/131 |

* cited by examiner

Primary Examiner — Vicky Johnson

(57) ABSTRACT

The pedal assembly includes a pedal and a cleat. The pedal has a spindle portion, a front portion with a front engagement member, a rear portion and a rear engagement member movably coupled to the rear portion. The cleat has a front engagement end and a rear engagement end. A front edge of the spindle portion is formed with a V-shaped positioning side. A U-shaped pad is attached under the front engagement end. Two legs of the pad are protrudent from the bottom of the cleat, and ends of the legs are separately formed with two abutment surfaces. The abutment surfaces abut against the positioning side.

10 Claims, 9 Drawing Sheets

BICYCLE PEDAL ASSEMBLY

BACKGROUND OF THE INVENTION

1. Technical Field

The invention relates to a pedal of bicycle, particularly to a step-in or clipless pedal.

2. Related Art

In recently years, bicycling becomes a worldwide popular form of recreation, sport and transportation. Depending upon different purposes of bicycling, there are many kinds of bicycles, such as road bikes, mountain bikes, folding bikes, etc. Whether bicycles are used for recreation, transportation or competition, the bicycle industry always keeps improving all components bicycle. An important component of a bicycle, especially for road bikes, is the step-in pedal, as known as clipless pedal.

The step-in or clipless pedal releasably engages with a cleat fastened under a sole of a cyclist's shoe. The clipless pedal has a spindle that can be screwed on a crank arm, a pedal body which is rotatably mounted on this spindle, and a cleat engagement mechanism on the pedal body. In a road bike, a racing clipless pedal typically has a cleat engagement mechanism on one side of the pedal body. A rider steps onto the pedal and the cleat engagement mechanism automatically grips the cleat to the sole of the rider's shoe.

More specifically, when attaching the cyclist's shoe to the step-in pedal via the cleat, the cyclist moves the shoe obliquely downwardly and forwardly relative to the pedal body such that the front end of the cleat engages a front hook or clamping member of the pedal body. Once the front end of the cleat is engaged with the front hook of the pedal body, the cyclist places the rear end of the cleat in contact with a guide portion of the rear hook or clamping member of the pedal body. In this position, the cyclist presses the shoe downwardly against the pedal to cause the rear hook or clamping member to initially pivot rearwardly against the force of a spring to move the rear hook or clamping member to a cleat releasing position. The rear end of the cleat then enters a position opposite a back face of the rear hook or clamping member. Then, the rear hook or clamping member returns under the force of a biasing member or spring so that the rear hook or clamping member engages the rear end of the cleat. This engagement fixes the cyclist's shoe to the pedal via the cleat.

Although the engagement of the pedal and cleat appears secure, in fact it is not secure enough because there are only two engagement points at the front end and rear end and the cleat still can horizontally rotate relative to the pedal. On the other hand, conventional cleats and pedals are made of rigid material, so there must be gaps between them. These gaps may also cause the engagement of the cleat and pedal to be unstable.

SUMMARY OF THE INVENTION

An object of the invention is to provide a pedal assembly, which increase engagement points between the cleat and pedal to improve stability and firmness of the engagement.

To achieve the above object, the pedal assembly of the invention includes a pedal and a cleat. The pedal has a spindle portion, a front portion with a front engagement member, a rear portion and a rear engagement member movably coupled to the rear portion. The cleat has a front engagement end and a rear engagement end. A front edge of the spindle portion is formed with a V-shaped positioning side. A U-shaped pad is attached under the front engagement end. Two legs of the pad are protrudent from the bottom of the cleat, and ends of the legs are separately formed with two abutment surfaces. The abutment surfaces abut against the positioning side.

DETAILED DESCRIPTION OF THE INVENTION

Figure 1:
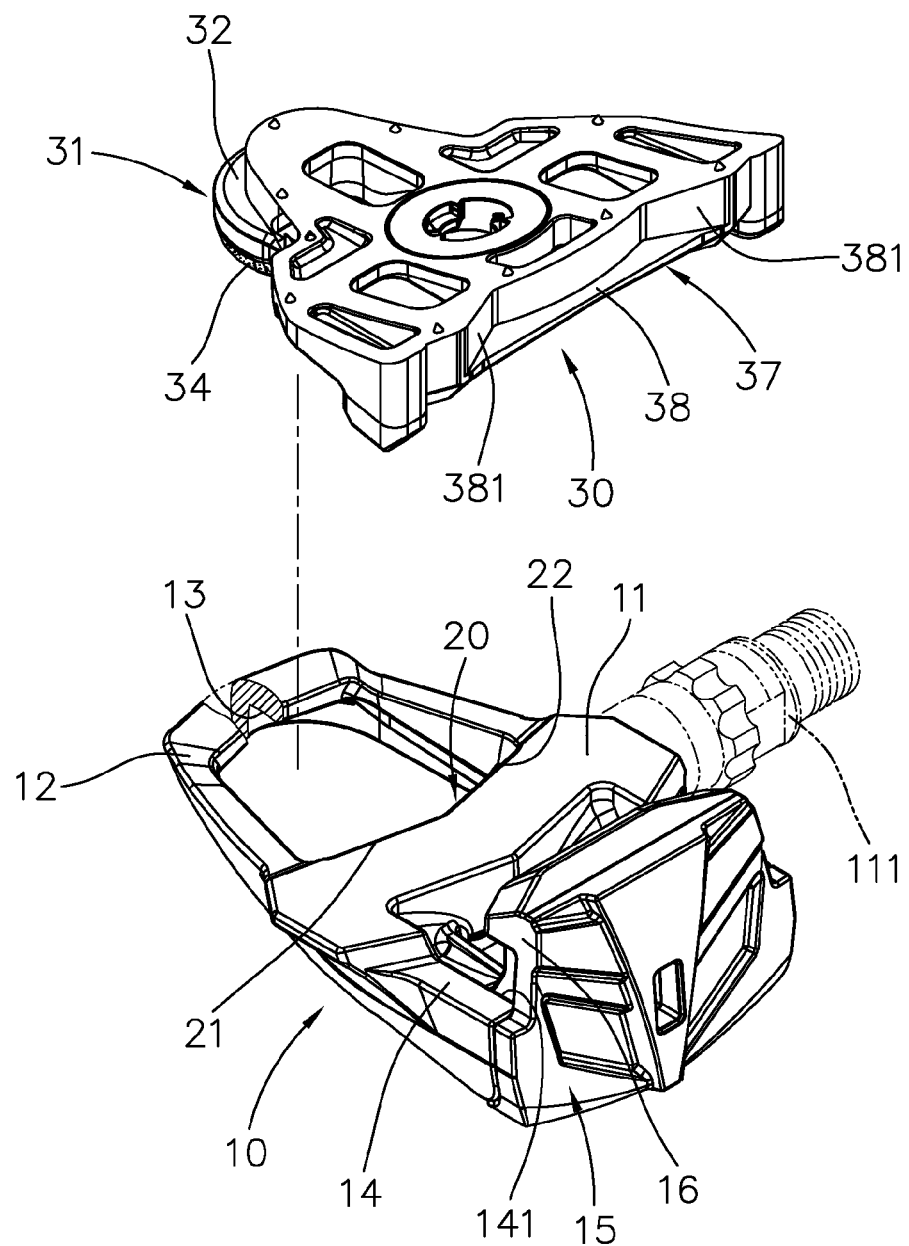
FIG. 1 is a perspective view of the invention.

Please refer to FIG. 1. The pedal assembly of the invention includes a pedal 10 and a cleat 30. The pedal 10 has a spindle portion 11, a front portion 12 with a front engagement member 13, a rear portion 14 and a rear engagement member 15 movably coupled to the rear portion 14. The cleat 30 can be engaged between the front engagement member 13 and the rear engagement member 15.

Figure 3:
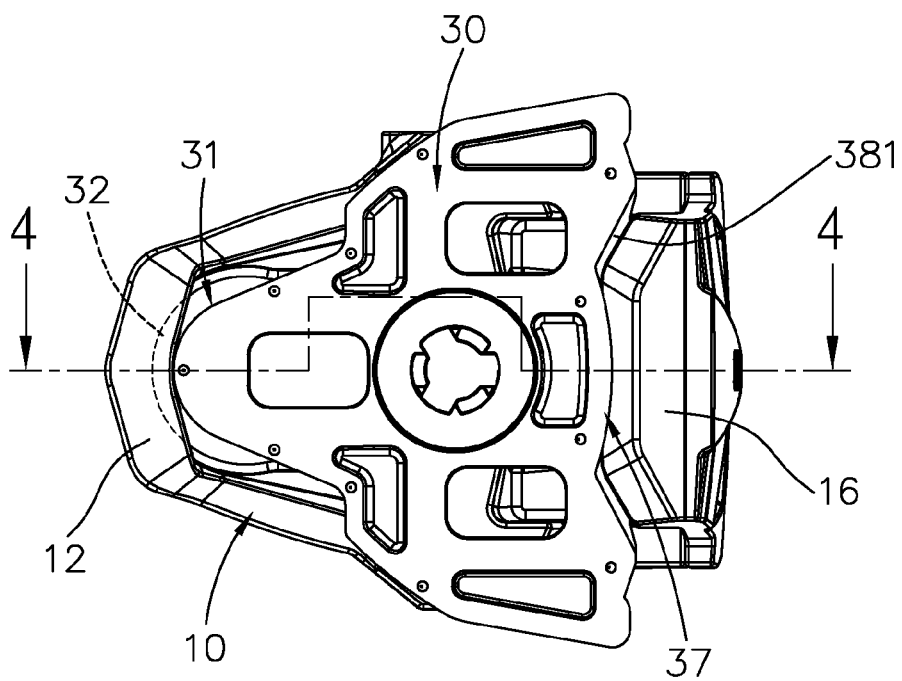
FIG. 3 is a top elevational view of the combination of the cleat and the pedal.
Figure 4:
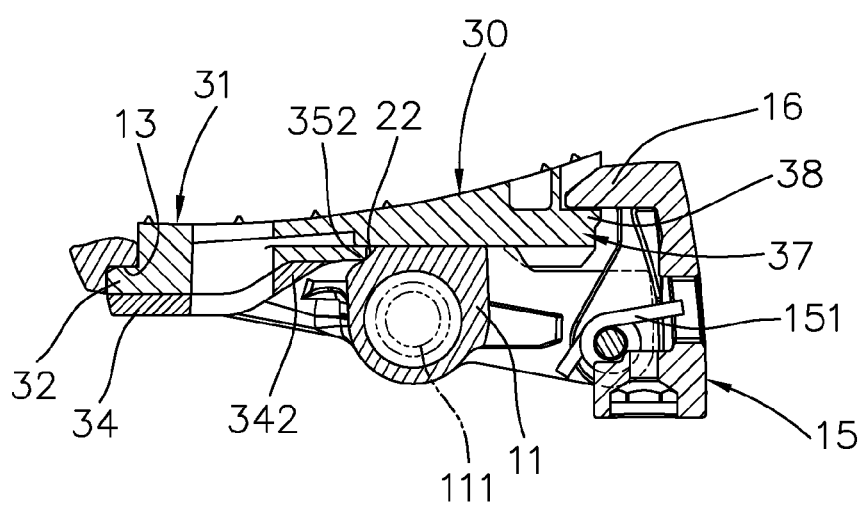
FIG. 4 is a sectional view along line 4-4 in FIG. 3.

Please refer to FIGS. 1 and 3. A spindle 111 is rotatably received in the spindle portion 11. The front and rear portions 12, 14 separately oppositely extend from the spindle portion 11. The rear portion 14 is formed with a connecting portion 141 for connecting the rear engagement member 15. The rear engagement member 15 has a hook 16. As shown in FIG. 4, a spring 151 is disposed between the rear engagement member 15 and the rear portion 14. The front engagement member 13 is also like a hook in shape.

A front edge of the spindle portion 11 is formed with a concave V-shaped positioning side 20. The positioning side 20 is composed of a first wing 21 and a second wing 22. The joint of the wings 21, 22 is about at the center of the spindle portion 11.

Figure 2:
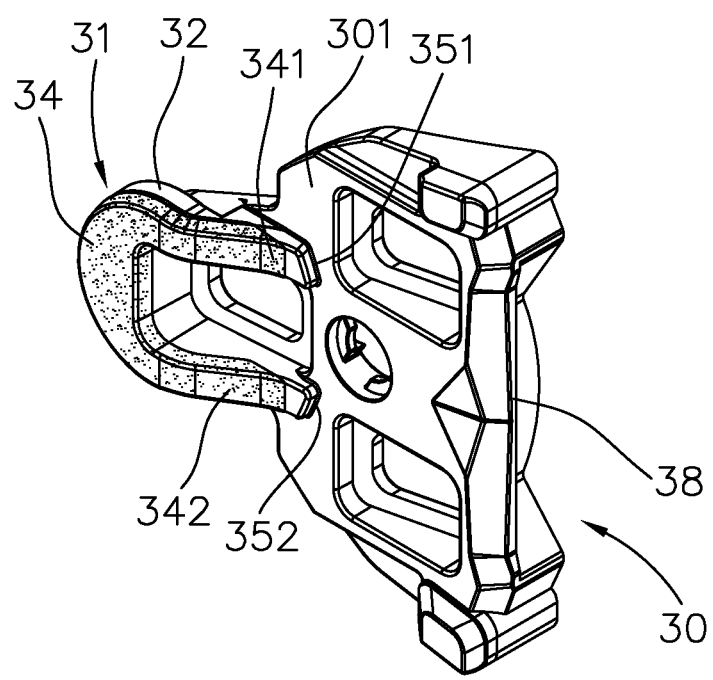
FIG. 2 is a perspective view of the cleat of the invention.

Please refer to FIG. 2. The cleat 30 has a front engagement end 31 with an arched surface 32 and a rear engagement end 37 with a flange 38. The flange 38 is formed with two slants 381.

Figure 5:
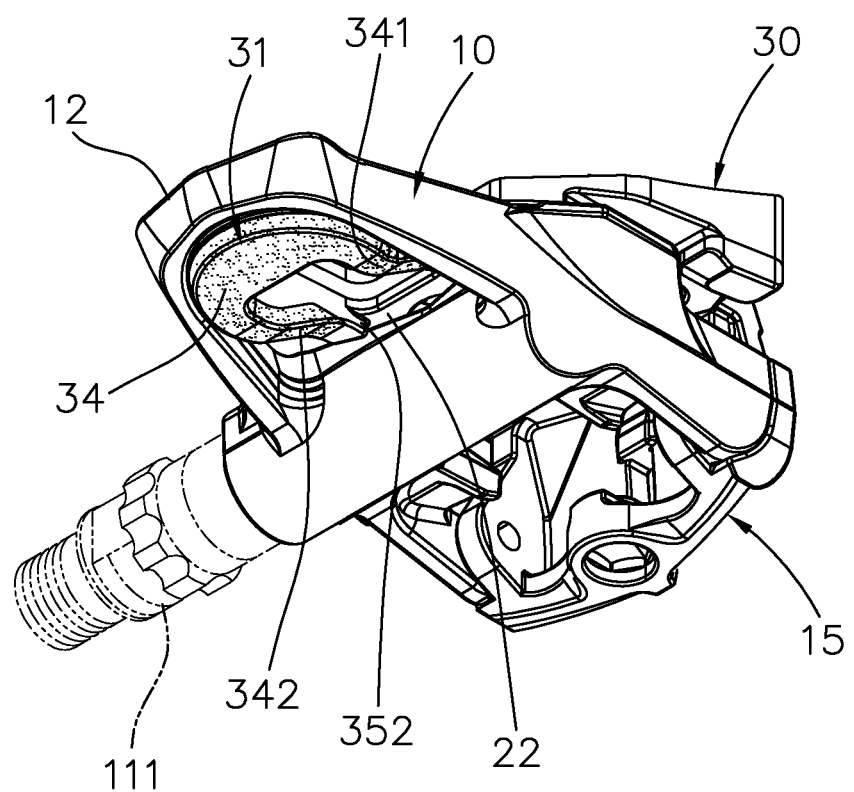
FIG. 5 is a perspective view of the combination of the cleat and the pedal.
Figure 6:
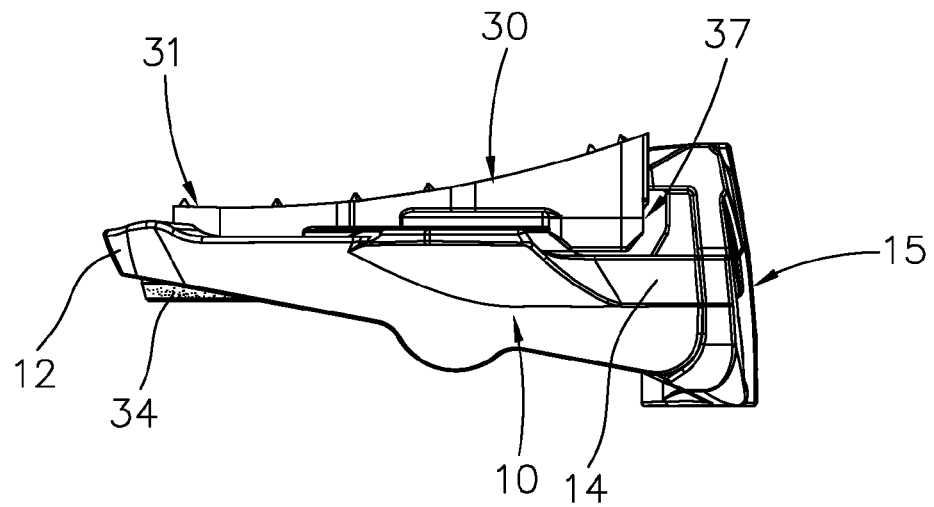
FIG. 6 is side view of the combination of the cleat and the pedal.
Figure 7:
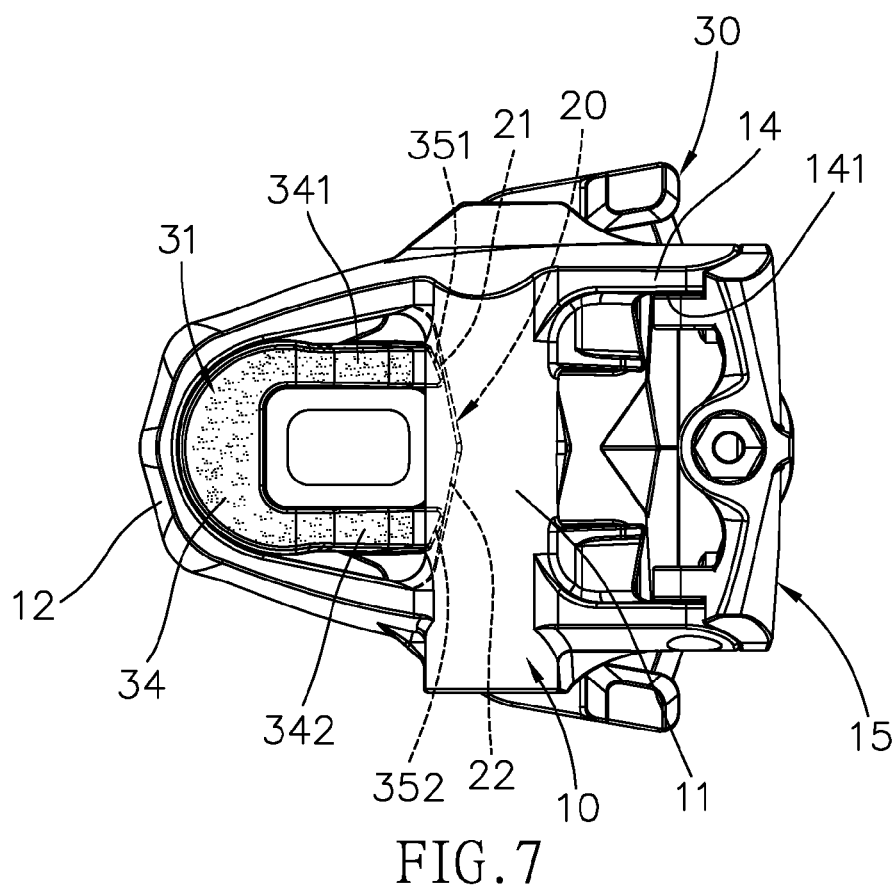
FIG. 7 is a bottom view of the combination of the cleat and the pedal.

A U-shaped pad 34 is attached under the front engagement end 31. The pad 34 is made of a flexible material such as rubber. The bottom of the pad 34 does not protrude from the arched surface 32. A first leg 341 and a second leg 342 of the pad 34 are protrudent from the bottom of the cleat 30. The bottom of the cleat 30 is formed with a first abutment block 351 and a second abutment block 352, which separately correspond to the first and second wings 21, 22 of the positioning side 20. Thus, the abutment blocks 351, 352 can separately abut against the wings 21, 22 of the positioning side 20 as shown in FIGS. 5 and 7 and ends of the legs 341, 342 are separately attached to the abutment blocks 351, 352.

Figure 8:
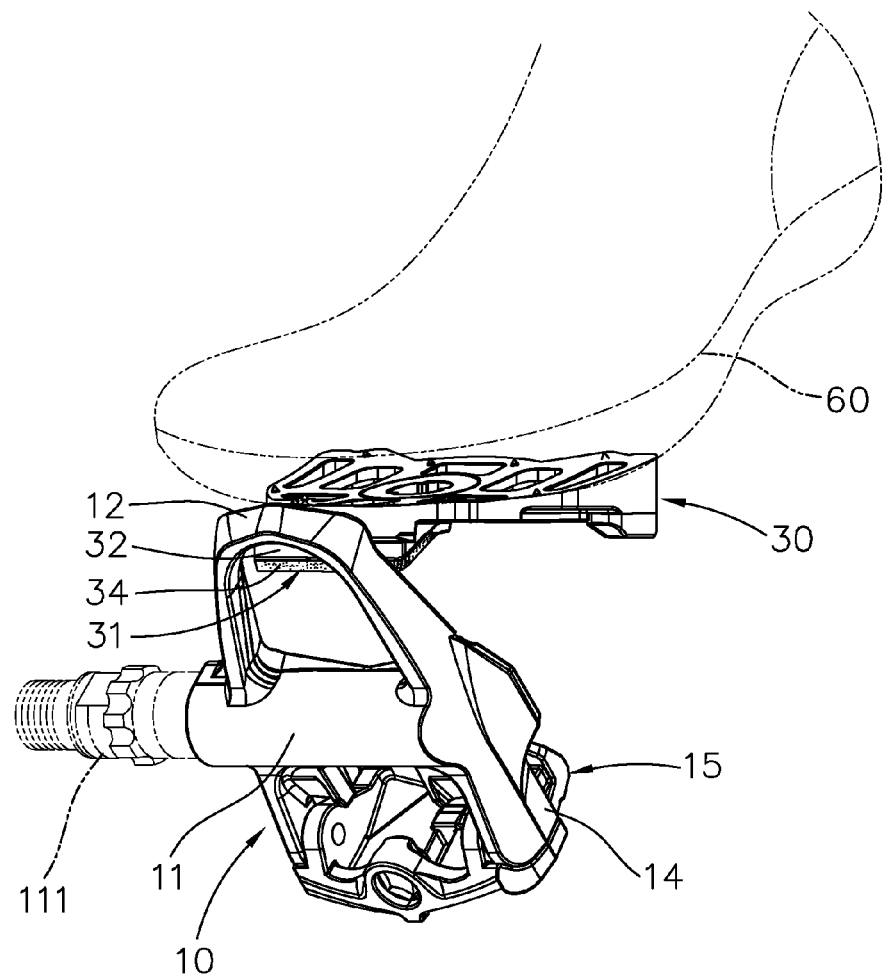
FIG. 8 is a schematic view showing the cleat under the sole is engaging the pedal.
Figure 9:
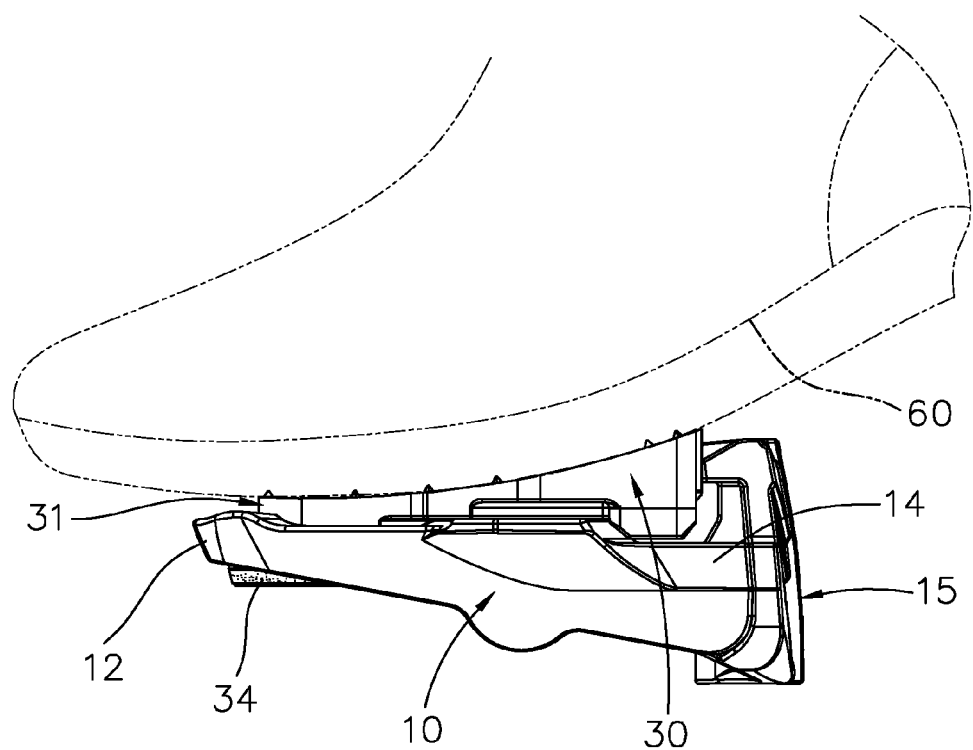
FIG. 9 is a schematic view showing the cleat under the sole has engaged the pedal.

Please refer to FIGS. 8 and 9. The cleat 30 is fastened to a sole of a cyclist's shoe 60. When the cleat 30 is engaged with the pedal 10 by clamping the front engagement member 13 with the front engagement end 31 and the rear engagement member 15 with the rear engagement end 37, the abutment blocks 351, 352 are also separately in contact with the wings 21, 22 of the positioning side 20.

Due to the elasticity of the flexible material of the pad 34, it can be slightly compressed by the wings 21, 22 to keep a firm and stable abutment. Also, this elasticity may provide a potential gap to make the cleat 30 releasable from the pedal 10. As shown in FIGS. 4, 5 and 7, the two abutments formed by the legs 341, 342 and the wings 21, 22 can provide an auxiliary stability between the cleat 30 and the pedal 10. Moreover, because the two wings 21, 22 is formed into a V-shape, this can prevent the cleat 30 from transversely moving on the pedal 10.

Figure 10:
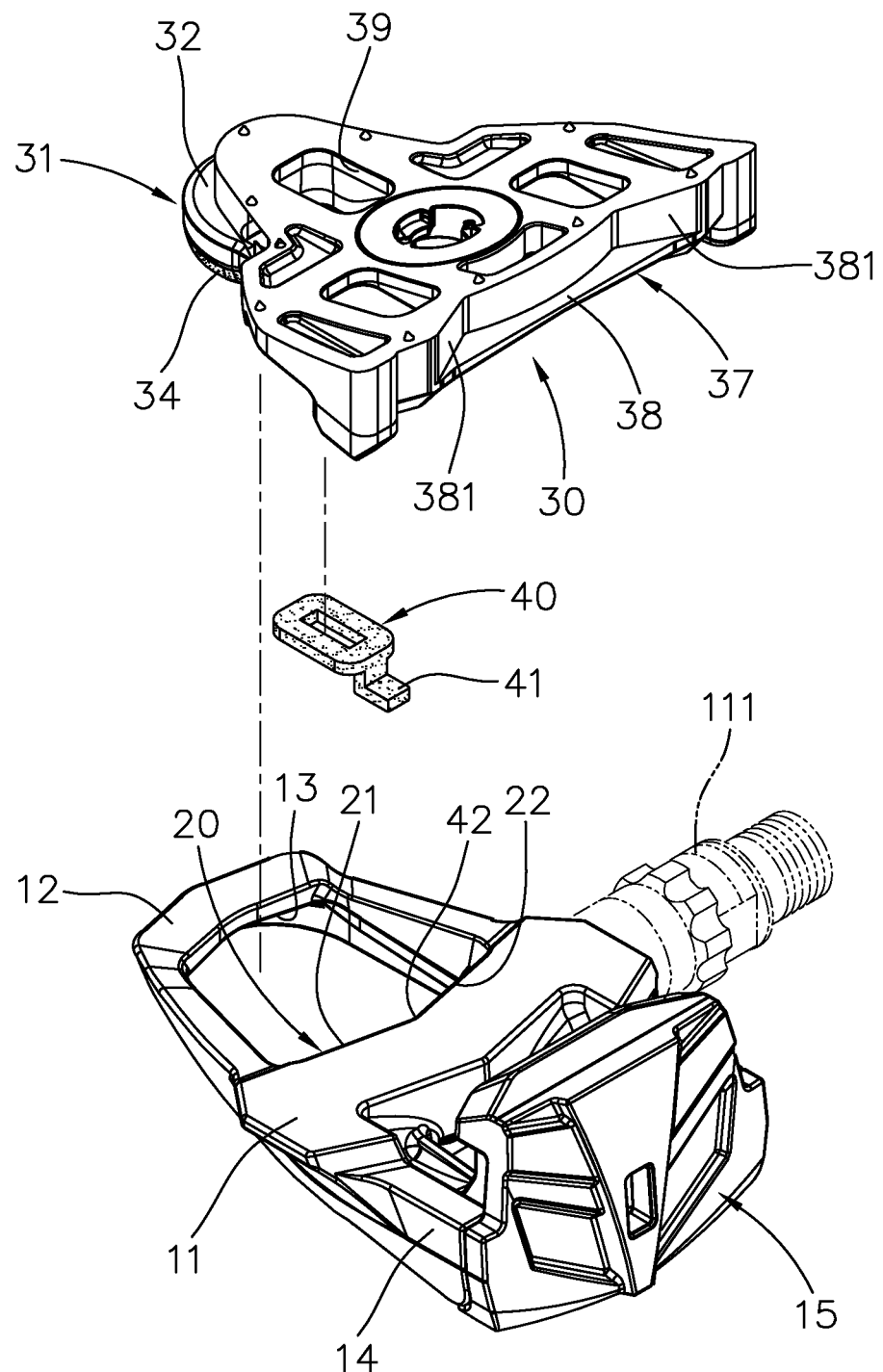
FIG. 10 is an exploded view of another embodiment of the invention.
Figure 11:
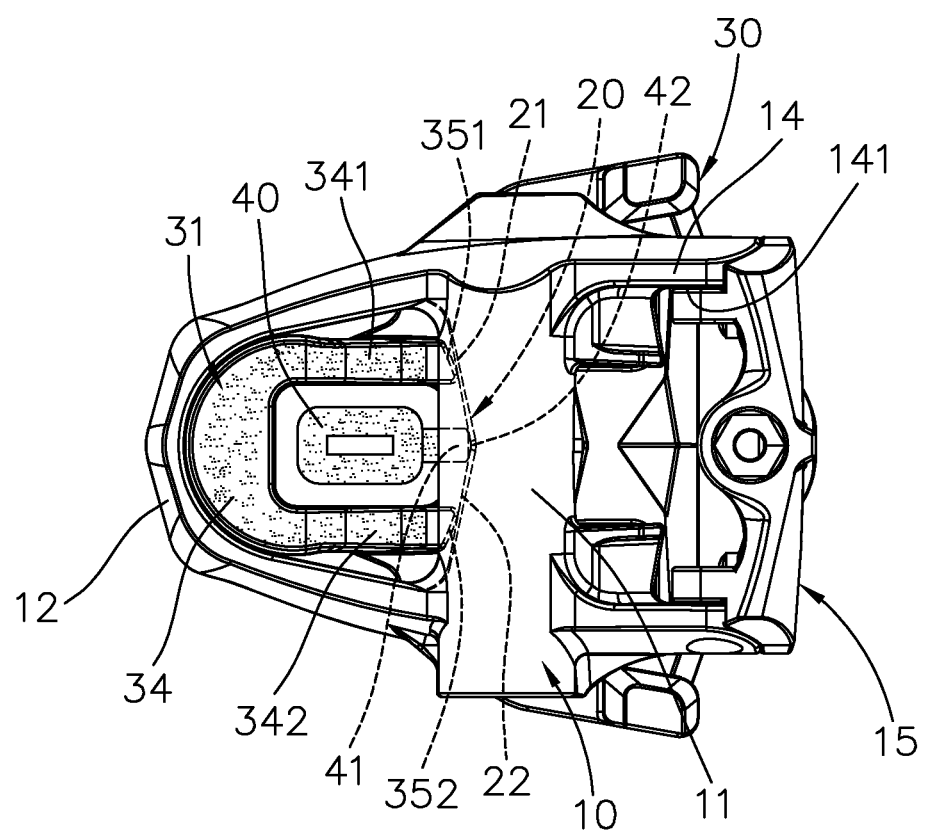
FIG. 11 is a bottom view of the embodiment shown in FIG. 10.

FIGS. 10 and 11 show another embodiment of the invention. In this embodiment, an auxiliary plug 40 is received in a hole 39 in the front engagement end 31. The auxiliary plug 40 is a hollow frame with a tongue 41. When the front engagement end 31 is clamped with the front portion 12, the tongue 41 just abuts against a joint 42 of the wings 21, 22. This offers the third abutment other than the two abutments from the pad 34.

It will be appreciated by persons skilled in the art that the above embodiments have been described by way of example only and not in any limitative sense, and that various alterations and modifications are possible without departure from the scope of the invention as defined by the appended claims.

What is claimed is:

1. A bicycle pedal assembly comprising:
   a pedal, having a spindle portion, a front portion with a front engagement member, a rear portion and a rear engagement member movably coupled to the rear portion; and
   a cleat, having a front engagement end corresponding to the front engagement member and a rear engagement end corresponding to the rear engagement member;
   wherein a front edge of the spindle portion is shaped into a V-shaped positioning side composed of a first wing and a second wing, a U-shaped pad corresponding to the front engagement end is attached only under a bottom of the front engagement end, the pad has a first leg and a second leg, the first and second legs are protrudent from a bottom of the cleat, the bottom of the cleat is formed with a first abutment block and a second abutment block, the first and second abutment blocks separately abut against the first and second wings, and ends of the legs are separately attached to the abutment blocks.

2. The bicycle pedal assembly of claim 1, wherein the positioning side is concave.

3. The bicycle pedal assembly of claim 1, wherein the pad is made of a flexible material.

4. The bicycle pedal assembly of claim 3, wherein the pad is made of rubber.

5. The bicycle pedal assembly of claim 4, wherein an auxiliary plug is received in a hole in the front engagement end, the auxiliary plug is provided with a tongue, and the tongue abuts against the joint of the wings when the front engagement end is clamped with the front portion.

6. The bicycle pedal assembly of claim 1, wherein a joint of the first and second wings is located about at a center of the spindle portion.

7. A cleat comprising:
   a front engagement end;
   a rear engagement end; and
   a pad, attached only under a bottom of the front engagement end, being formed in a U-shape corresponding to the front engagement end, and having a first leg and a second leg, wherein the first and second legs are protrudent from a bottom of the cleat, the bottom of the cleat is formed with a first abutment block and a second abutment block, and ends of the legs are separately attached to the abutment blocks.

8. The cleat of claim 7, wherein the pad is made of a flexible material.

9. The cleat of claim 8, wherein the pad is made of rubber.

10. The cleat of claim 7, wherein an auxiliary plug is received in a hole in the front engagement end, and the auxiliary plug is provided with a tongue.

* * * * *